United States Patent
Mitani et al.

(10) Patent No.: US 6,875,541 B2
(45) Date of Patent: Apr. 5, 2005

(54) ELECTROCHEMICAL CELL USING INDOLE-RELATED COMPOUNDS

(75) Inventors: Masaya Mitani, Sendai (JP); Toshihiko Nishiyama, Sendai (JP); Hiroyuki Kamisuki, Sendai (JP); Gaku Harada, Tokyo (JP); Masato Kurosaki, Tokyo (JP); Yuji Nakagawa, Tokyo (JP); Tomoki Nobuta, Sendai (JP); Shinako Kaneko, Sendai (JP)

(73) Assignee: NEC TOKIN Corporation, Sendai (JP)

( * ) Notice: Subject to any disclaimer, the term of this patent is extended or adjusted under 35 U.S.C. 154(b) by 223 days.

(21) Appl. No.: 10/286,692

(22) Filed: Nov. 1, 2002

(65) Prior Publication Data

US 2003/0129490 A1 Jul. 10, 2003

(30) Foreign Application Priority Data

Nov. 2, 2001 (JP) ........................ 2001/337837

(51) Int. Cl.[7] ............................ H01M 4/60; H01M 4/58
(52) U.S. Cl. ........................ 429/213; 429/218
(58) Field of Search .............................. 429/213, 218.1

(56) References Cited

U.S. PATENT DOCUMENTS 6,749,963 B2 * 6/2004 Kurosaki et al. ............ 429/213
2002/0058185 A1   5/2002 Kurosaki et al.

FOREIGN PATENT DOCUMENTS

| EP | 1 189 295 A2 |   | 3/2002 |
| EP | 1189295 | * | 3/2002 |
| EP | 1205995 | * | 5/2003 |
| JP | 2001-035494 | * | 2/2001 |
| JP | 2001-118577 | * | 4/2001 |
| JP | 2002-93419 A |   | 3/2002 |
| JP | 2003-142099 | * | 5/2003 |

* cited by examiner

Primary Examiner—Patrick Ryan
Assistant Examiner—Thomas H. Parsons
(74) Attorney, Agent, or Firm—Frishauf, Holtz, Goodman & Chick, P.C.

(57) ABSTRACT

An electrochemical cell contains, as an electrode active material, a mixture of trimer compounds each in the form of indoles or indole derivatives coupled to each other in second and third positions thereof, and tetramer compounds each of indoles or indole derivatives. In the cell, protons are used as charge carriers.

8 Claims, 4 Drawing Sheets

ELECTROCHEMICAL CELL USING INDOLE-RELATED COMPOUNDS

BACKGROUND OF THE INVENTION

1. Technical Field

The present invention relates to an electrochemical cell such as a secondary cell or a capacitor, and more specifically, relates to an electrochemical cell using indole-related compounds as an electrode active material and using protons as charge carriers.

2. Related Art

Indole-related polymers are known as active materials of cells that are excellent in electromotive force and capacitance. However, the cells using such indole-related polymers as active materials have not been fully satisfactory in terms of a quick charge/discharge characteristic and a cycle characteristic.

SUMMARY OF THE INVENTION

Therefore, it is an object of the present invention to provide an electrochemical cell, such as a secondary cell or a capacitor, that is excellent in high-rate characteristic and cycle characteristic while having a sufficient electromotive force.

It is another object of the present invention to provide an electrochemical cell having a high capacitance.

According to the present invention, there is provided an electrochemical cell such as a secondary cell or a capacitor which contains, as an electrode active material, a mixture of trimer compounds each in the form of indoles or indole derivatives coupled to each other in second and third positions thereof, hereinafter, such a trimer compound will be referred to as "indole-related trimer", and tetramer compounds each of indoles or indole derivatives, hereinafter, such a tetramer compound will be referred to as "indole-related tetramer", wherein protons are used as charge carriers.

DESCRIPTION OF THE PREFERRED EMBODIMENT

JP-A-2002-93419 proposed an electrochemical cell using indole-related trimers as an electrode active material. As a result of further studies, they have found that, in comparison with a case where indole-related trimers of high purity, approximately 100%, are used, the capacitance of a cell is improved in a case where indole-related trimers of a little lower grade or purity are used. Upon examining the reason thereof, it has been confirmed that tetramers are contained along with the trimers.

Figure 1A:
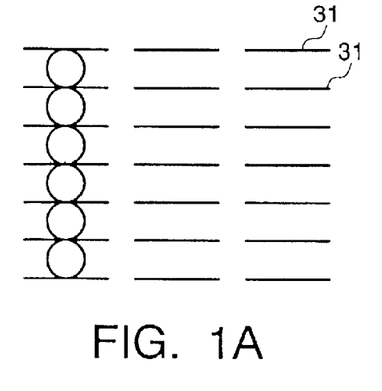
FIGS. 1A and 1B are diagrams schematically showing the states of dopants in indole-related trimers alone and a mixture of indole-related trimers and indole-related tetramers, respectively.

As shown in FIG. 1A, it is considered that since high-purity indole-related trimers 31 form a crystal structure in which molecules are stacked in layers, when doping necessary for an electrochemical cell is performed, dopants 35 are reluctant to be doped between the layers.

Figure 1B:
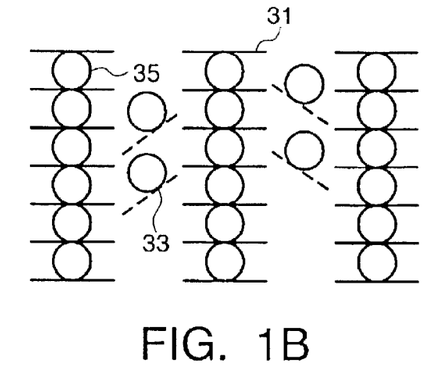

On the other hand, as shown in FIG. 1B, it is considered that when tetramers 33 are contained, an amorphous structure is formed rather than a crystal structure because the crystal structure is not easily formed, so that distances between layers of a trimer structure are increased to facilitate doping of dopants 35. As a result, it is considered that the doping concentration is enhanced to provide a high-capacitance cell.

Figure 2:
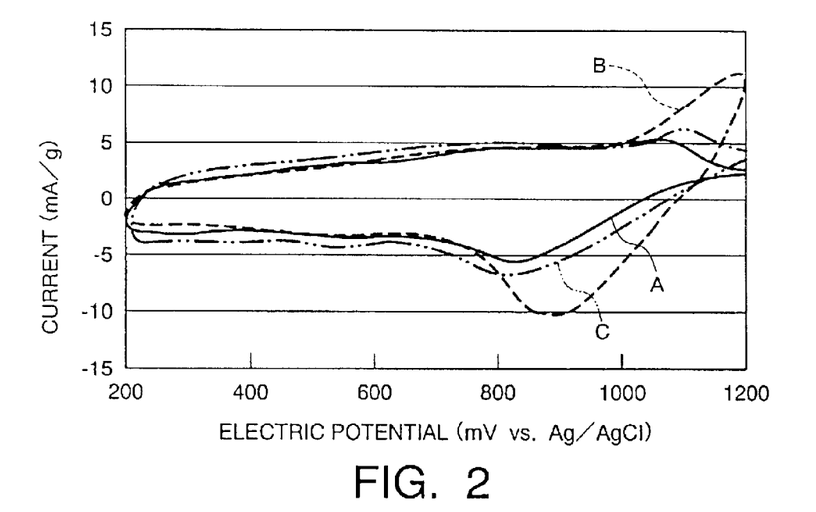
FIG. 2 is a cyclic voltammograph showing results of a cyclic voltammetry carried out by changing a mixing ratio of indole-related tetramers.

FIG. 2 shows results of a cyclic voltammetry (CV) measurement conducted for examining how the capacitance changes depending on mixing of tetramers. In this measurement, sample A obtained by applying approximately 100% trimers to a conductive rubber sheet, and samples B and C obtained by applying mixtures of trimers and tetramers to conductive rubber sheets, respectively, were used as working electrodes, P was used as a counter electrode of a saturated silver-silver chloride electrode, Ag/AgCl, was used as a reference electrode, the measuring temperature was set to 25° C., the scanning electric potential was set to 200 to 1200 mV, and the scanning speed was set to 1 mV/sec. Further, as an electrolyte, 40 wt % sulfuric acid aqueous solution was used. The results were shown in Table 1 below.

TABLE 1

| sample | tetramer mixing amount (%) | oxidation peak potential (mV) | reduction peak potential (mV) | formal oxidation-reduction potential (mV) | capacitance relative value (%) |
|---|---|---|---|---|---|
| A | — | 1050 | 820 | 935 | 73 |
| B | 1 | 1190 | 890 | 1040 | 100 |
| C | 33 | 1100 | 820 | 960 | 90 |

In Table 1, the capacitance relative value represents a relative value assuming that the capacitance of sample B is 100.

It can be seen that the capacitance is increased by mixing the tetramers. The reason why the capacitance of sample C is lower than that of sample B is that the number of moles per weight is simply decreased due to increase of the weight of tetramers so that the capacitance is lowered.

Now, a preferred embodiment of the present invention will be described.

Figure 3:
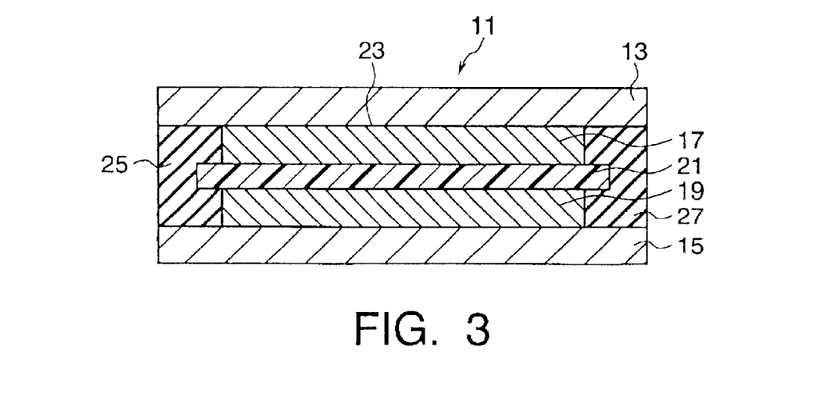
FIG. 3 is a schematic sectional view showing a cell or a capacitor according to a preferred embodiment of the present invention.

Referring to FIG. 3, an electrochemical cell 11, such as a secondary cell or a capacitor, according to this embodiment comprises collectors 13 and 15, a positive electrode material layer 17 and a negative electrode material layer 19 formed on the collectors 13 and 15, respectively, a separator 21 interposed between the positive electrode material layer 17 and the negative electrode material layer 19, and gaskets 25 and 27 made of insulating rubber or the like and provided on both sides of a layered body 23 in which the positive electrode material layer 17 and the negative electrode material layer 19 are stacked with each other via the separator 21 therebetween. An electrolyte containing protons is impregnated into the positive material layer, i.e. a positive electrode, 17 and the negative electrode material layer, i.e. a negative electrode, 19.

As an electrode material of the positive and negative electrodes, indole-related trimers are used. This indole-related trimer is expressed by the following general formula (I).

wherein R independently represents a hydrogen atom or a substituent group thereof.

This indole-related trimer can be prepared from, for example, indoles or indole derivatives, hereinafter referred to as "indole-related monomers", each expressed by general formula (II) given below, according to a known electrochemical or chemical technique utilizing a known reaction, such as electrochemical oxidation, chemical oxidation, condensation reaction or substitution reaction, depending on a substituent group thereof. Normally, indole-related monomers each having hydrogen atoms in the second and third positions, $R_1$ and $R_2$ in the following general formula (II), are used for the preparation of the indole-related trimer.

wherein R independently represents a hydrogen atom, a halogen atom, a hydroxyl group, a carboxyl group, a sulfone group, a sulfuric acid group, a nitro group, a cyano group, an alkyl group, an aryl group, an alkoxyl group, an amino group, an alkylthio group or an arylthio group, and $R_1$ and $R_2$ independently represent the same meaning as R.

As an indole-related trimer in the present invention, there can be cited such a compound that is expressed by the general formula (I), wherein R independently represents a hydrogen atom, a halogen atom, a hydroxyl group, a carboxyl group, a sulfone group, a sulfuric acid group, a nitro group, a cyano group, an alkyl group, an aryl group, an alkoxyl group, an amino group, an alkylthio group or an arylthio group. Substituent group R given in the general formula (I) is derived from substituent group R of an indole-related monomer used as a material thereof.

As a halogen atom of R in the general formulae (I) and (II), there can be cited fluorine, chlorine, bromine or iodine. Further, in the formulae, as an alkyl group of R, use can be made of a methyl group, an ethyl group, a propylene group, an isopropyl group, an n-buthyl group, an s-buthyl group, an isobuthyl group, a t-buthyl group, an n-penthyl group, an n-hexyl group, an n-heptyl group or an n-octyl group.

Further, in the formulae, an alkoxyl group of R is a group represented by —OX, wherein the foregoing alkyl group can be cited as X.

Further, in the formulae, as an aryl group of R, use can be made of a phenyl group, a naphthyl group, an antoryl group, a phenanthryl group or the like.

Further, in the formulae, as an alkyl portion of an alkylthio group of R, the foregoing alkyl group can be cited. Further, in the formulae, as an aryl portion of an arylthio group of R, the foregoing aryl group can be cited.

Indole-related tetramers of the present invention can be expressed by general formulae (IIIA) to (IIIG) given in the following formulae 4 and 5.

(IIIC)

(IIIF)

(IIID)

(IIIG)

(IIIE)

wherein R represents the same meaning as R explained above.

Like the foregoing indole-related trimer, each of these indole-related tetramers can be prepared from indole-related monomers each expressed by the foregoing general formula (II), according to the known electrochemical or chemical technique utilizing the known reaction, such as electrochemical oxidation, chemical oxidation, condensation reaction or substitution reaction, depending on a substituent group thereof. In general, as described above, the indole-related tetramers are produced as by-products upon preparing the indole-related trimers. In this event, mixtures of isomers represented by the foregoing general formulae (IIIA) to (IIIC) or/and (IIID) to (IIIG) are included in a given ratio. It is considered that no difference exists in influence exerted to the characteristic among these isomers. On the other hand, particularly in case of the tetramers of the general formulae (IIID) to (IIIG), oxidative deterioration can be effectively suppressed so that not only the capacitance but also the cycle characteristic are expected to be improved.

The amount of tetramers to be contained in trimers can be adjusted by properly setting the condition upon the preparation. If the tetramers are contained so much, since the molecular weight of a tetramer is large, the number of moles is decreased in the mixture of the trimers and tetramers as compared with the trimers of the same weight, so that the capacitance is lowered.

The mixing ratio of tetramers into the mixture is 60 mass % as the upper limit, and preferably about 30 mass %. No particular lower limit may be defined because if the tetramers are slightly contained, the capacitance is increased as compared with 100% trimers. On the other hand, it is desirable that the tetramers are contained at 0.01 mass % or greater, and more preferably, at 0.1 mass % or greater.

For ensuring the conductivity, a conduction assisting material is added to the electrode if necessary. As a conduction assisting material, there can be cited a conductive material, such as crystalline carbon, carbon black or graphite. Further, for maintaining the moldability of the electrode and fixing such a material on the collector, a binder may be added if necessary.

The mixing ratio of a constituent material of the electrode is optional inasmuch as a desired characteristic can be obtained. On the other hand, if the efficiency per unit mass or unit capacitance is considered, it is desirable that the mixture of the indole-related trimers and the indole-related tetramers is within a range of 30 to 95 mass %, the conduction assisting material is within a range of 5 to 50 mass %, and the binder is within a range of 0 to 20 mass %.

As the electrolyte, an aqueous solution or a nonaqueous solution containing protons is preferably used so that protons are used as charge carriers of the indole-related trimers. The proton concentration of the electrolyte is preferably within a range of $10^{-3}$ to 18 mol/l. For improving the conductivity or other characteristics, a salt or a surface active agent may be added to the electrolyte.

As the separator, a porous film made of polyethylene, fluororesin or the like can be used inasmuch as it is electrically insulative and it has or can give ionic conductivity. The porous film is impregnated with the electrolyte so as to be used. Alternatively, instead of such a separator, an electrolyte, such as a gel electrolyte or a solid electrolyte, may be interposed between the electrodes.

In this embodiment, the indole-related trimer is subjected to doping according to an electrochemical or chemical technique, as expressed by a reaction formula 1 given below. In the formula, $X^-$ represents a dopant ion, such as a sulfuric acid ion, a halide ion, a perchloric acid ion or a trifluoroacetic acid ion, but is not limited thereto and may be another ion inasmuch as it can give an electrochemical activity when doped to the indole-related trimer.

As expressed by a reaction formula 2 given below, the indole-related trimer subjected to the doping causes an electrochemical reaction accompanying adsorption-desorption of protons. Specifically, upon giving and receiving electrons following an oxidation-reduction reaction of an indole-related trimer, only the adsorption-desorption of protons of the indole-related trimer is concerned therein. The electrochemical cell of the present invention using the indole-related trimers causing such an electrochemical reaction as an electrode material exhibits those effects such that since a moving substance upon electrochemical reaction is only protons, a volume change of the electrode following the reaction is small, thus leading to an excellent cycle characteristic of the cell, and further, since mobility of protons is high, the reaction is quick, thus leading to an excellent high-rate characteristic, i.e. an excellent rapid charge/discharge characteristic.

Reaction Formula 2

Further, as shown in a formula (IV) given below, the simultaneously mixed indole-related tetramer also exhibits a similar electrochemical reaction. Although explanation is made here based on the formula (IIIA) as an example, it is also applicable to the other isomer compounds.

Normally, in an indole-related trimer, a proton on imino nitrogen is freely movable as described above and as shown in (a) given below, so that even if it is separated upon oxidation, it is recovered upon reduction. On the other hand, in case of a proton not on imino nitrogen, i.e. in case of a

(IV)

On the other hand, with respect to a mechanism of suppressing oxidative deterioration based on the tetramer (IIID) or (IIIG), it is considered as follows.

substituent group R itself being a hydrogen atom on R, once it comes off, there are instances where it is not recovered. In this event, the electrochemical activity is lost so that it can not function as an active material. This is called "oxidative deterioration". On the other hand, as shown in (b) given below, when the foregoing tetramer exists, a proton on imino nitrogen of the tetramer moves to a portion where the proton is lost and the tetramer itself is subjected to cleavage into a trimer, so that the deactivated portion can be restored. As a result, it is considered that the oxidative deterioration can be suppressed.

Hereinbelow, explanation will be made in detail using a secondary cell as an example of an electrochemical cell of the present invention. By properly setting the capacitance, charge/discharge rate or the like, however, it can be suitably structured as another electrochemical cell, such as a capacitor.

EXAMPLE 1

A cell 11 having the foregoing structure as shown in FIG. 3 was prepared according to an ordinary method. As outer casing members, gaskets 25 and 27 made of insulating rubber were provided. As collectors 13 and 15, members made of conductive rubber were used. As a separator 21, a separator in the form of a porous film impregnated with an electrolyte was used. As an electrolyte, 40% sulfuric acid aqueous solution was used.

For a positive electrode material layer 17, a mixture of indole-related trimers and indole-related tetramers (mixing ratio: 10:1) prepared from 6-nitro indole monomers was used as an active material. As a conduction assisting material, vapor phase epitaxy carbon fibers were used.

For a negative electrode material layer 19, a quinoxaline polymer expressed by a formula (V) given below was used as an active material. As a conduction assisting material, carbon black was used. When the mixture of the indole-related trimers and the indole-related tetramers is used for the positive electrode, the active material to be used for the negative electrode is not limited thereto and thus may be another material inasmuch as it is electrochemically active and exhibits reversible oxidation-reduction reactions. The mixing ratio between the active material and the conduction assisting material forming the electrode was set to 75:25 (active material:conduction assisting material) in the mass ratio in either of the positive and negative electrodes.

(V)

Figure 4:
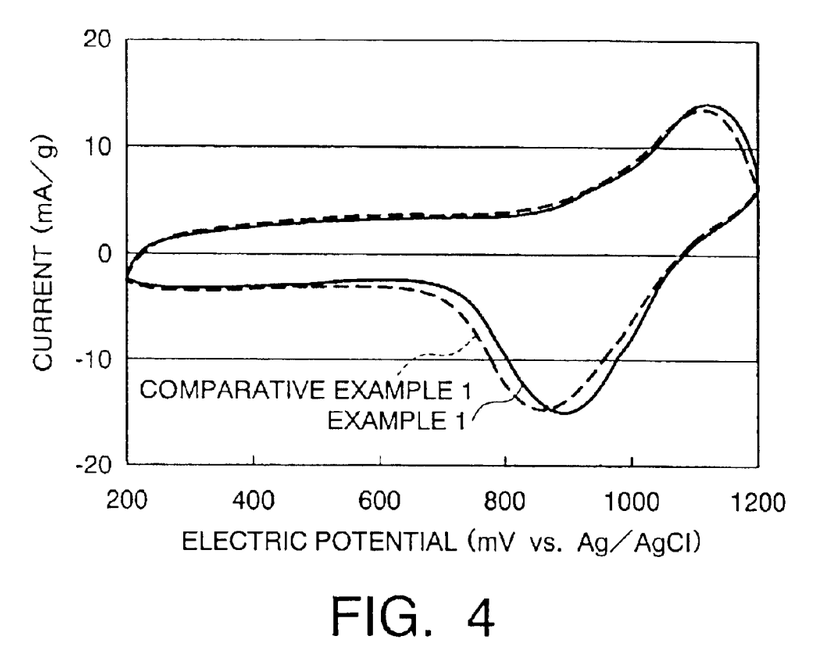
FIG. 4 is a cyclic voltammograph relating to positive electrodes of cells according to example 1 and comparative example 1.

Referring to FIG. 4, a cyclic voltammograph relating to the positive electrode material layer 17 in a sulfuric acid aqueous solution is shown. In the first reaction region (200 to 800 mV vs. Ag/AgCl), the doping-dedoping of dopant ions represented by the reaction formula 1 occurs, and the current attendant thereupon is observed. In the second reaction region (800 to 1200 mV vs. Ag/AgCl), the adsorption-desorption of protons represented by the reaction formula 2 occurs.

Figure 5:
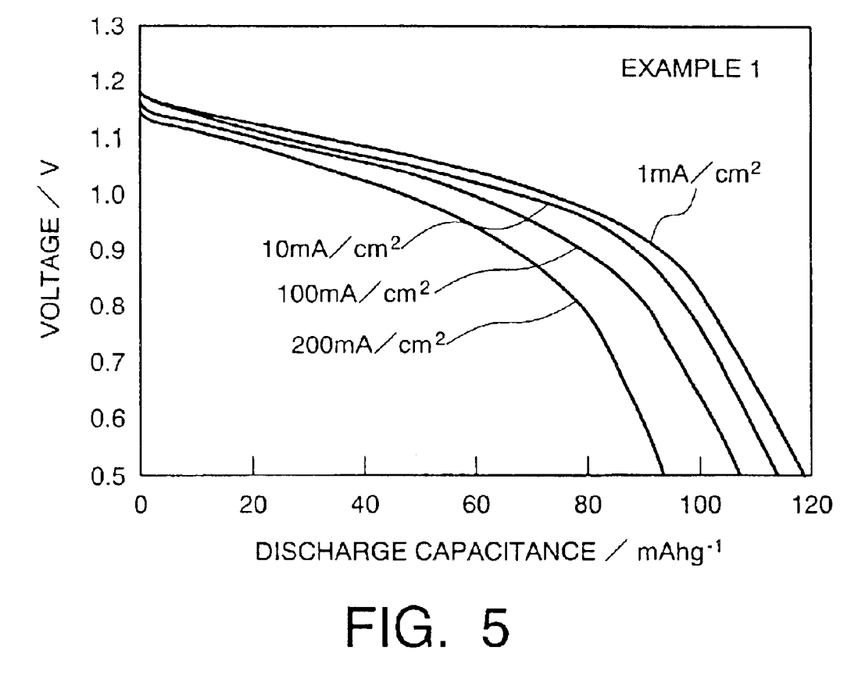
FIG. 5 is a graph showing results (discharge curves) of a charge/discharge test of the cell according to example 1.

For evaluating the prepared cell, a charge/discharge test was conducted. Constant-current charge was carried out up to 1.2V at 10 mA/cm$^2$, and discharge was performed with the constant current of 1 to 200 mA/cm$^2$. The results are shown in FIG. 5. The discharge capacitance is indicated per unit weight of the active material. A list of capacitances down to 0.9V is shown in Table 2.

When the discharge current was increased from 1 mA/cm$^2$ to 200 mA/cm$^2$, the discharge capacitance was decreased from 93 mAh/g to 66 mAh/g and thus the reduction rate was 27%. As compared with Reference Example 1, the whole capacitances were improved, and this reduction rate practically raises no problem.

Further, a cycle test was conducted wherein charge up to 1.2V and discharge down to 0.9V (charge-discharge current was constant current of 10 mA/cm$^2$) were repeated. As a result, the number of cycles wherein the capacitance was decreased to 80% of the initial capacitance was 38000.

EXAMPLE 2

A cell was prepared that was the same as that of Example 1 except that a mixture of trimers and tetramers prepared from 5-cyano indole monomers was used as an active material of a positive electrode layer 17.

A charge/discharge test was conducted like in Example 1. A list of capacitances down to 0.9V is shown in Table 2. When the discharge current was increased from 1 mA/cm$^2$ to 200 mA/cm$^2$, the discharge capacitance was decreased from 97 mAh/g to 72 mAh/g and thus the reduction rate was 25%. The whole capacitances were further improved.

Further, a cycle test was conducted wherein charge up to 1.2V and discharge down to 0.9V (charge-discharge current was constant current of 1 mA/cm) were repeated. The number of cycles wherein the capacitance was decreased to 80% of the initial capacitance was 29000.

As compared with reference sample 2, the increase of the capacitance was confirmed also in this example.

EXAMPLE 3

A cell was prepared that was the same as that of Example 1 except that a propylene carbonate solution, hereinafter referred to as "PC solution", wherein 1 mol/l of tetrafluoroboric acid tetraethylammonium and 0.1 mol/l of trifluoroacetic acid were dissolved, was used as an electrolyte.

Figure 6:
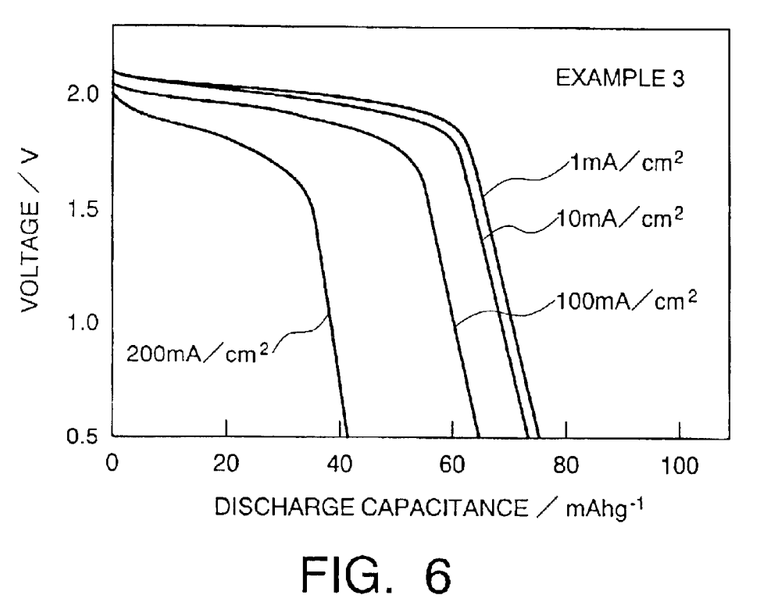
FIG. 6 is a graph showing results (discharge curves) of a charge/discharge test of a cell according to example 5.

For evaluating the prepared cell, a charge/discharge test was conducted. Constant-current charge was carried out up to 2.3V at a current density of 10 mA/cm$^2$, and discharge was performed with the constant current of 1 to 200 mA/cm$^2$. The results are shown in FIG. 6. A list of capacitances down to 0.5V is shown in Table 2.

Hereinafter in the description, current will be represented by a current density (mA/cm$^2$).

When the discharge current was increased from 1 mA/cm$^2$ to 200 mA/cm$^2$, the capacitance was decreased from 75 mAh/g to 43 mAh/g and thus the reduction rate was 43%.

Further, a cycle test was conducted wherein charge up to 2.3V and discharge down to 0.5V (charge-discharge current was constant current of 1.0 mA/cm$^2$) were repeated. As a result, the number of cycles wherein the capacitance was decreased to 80% of the initial capacitance was 25000.

In case of a cell (Comparative Example 3) using the same electrolyte and using indole-related polymers prepared from the same indole-related monomers, when the discharge current was increased from 1 mA/cm$^2$ to 200 mA/cm$^2$, the capacitance was decreased by 73%, while the capacitance was decreased only by 43% in Example 3. As compared with Comparative Example 3, the capacitances were improved on the whole.

Reference Example 1

A cell was prepared that was the same as that of Example 1 except that only trimer compounds were used as a positive electrode active material. A charge/discharge test was conducted like in Example 1. A list of capacitances down to 0.9V is shown in Table 2. When the discharge current was increased from 1 mA/cm$^2$ to 200 mA/cm$^2$, the discharge capacitance was decreased from 78 mAh/g to 62 mAh/g and thus the reduction rate was only 20%.

Further, a cycle test was conducted like in Example 1. As a result, the number of cycles wherein the capacitance was decreased to 80% of the initial capacitance was 31000, meaning that the cycle characteristic was excellent.

Reference Example 2

A cell was prepared that was the same as that of Example 2 except that only trimer compounds were used as a positive electrode active material.

A charge/discharge test was conducted like in Example 1. A list of capacitances down to 0.9V is shown in Table 2. When the discharge current was increased from 1 mA/cm$^2$ to 200 mA/cm$^2$, the discharge capacitance was decreased from 78 mAh/g to 62 mAh/g and thus the reduction rate was only 16%.

Further, a cycle test was conducted like in Example 1. As a result, the number of cycles wherein the capacitance was decreased to 80% of the initial capacitance was 25000, meaning that the cycle characteristic was excellent.

Reference Example 3

A cell was prepared that was the same as that of Example 3 except that only trimer compounds were used as a positive electrode active material. A charge/discharge test was conducted like in Example 1. A list of capacitances down to 0.9V is shown in Table 2. When the discharge current was increased from 1 mA/cm$^2$ to 200 mA/cm$^2$, the discharge capacitance was decreased from 70 mAh/g to 40 mAh/g and thus the reduction rate was 44%.

Further, a cycle test was conducted like in Example 1. As a result, the number of cycles wherein the capacitance was decreased to 80% of the initial capacitance was 19000.

Comparative Example 1

A cell was prepared that was the same as that of Example 1 except that poly-6-nitro indole being indole-related polymer was used as an active material of a positive electrode material layer 17.

Figure 7:
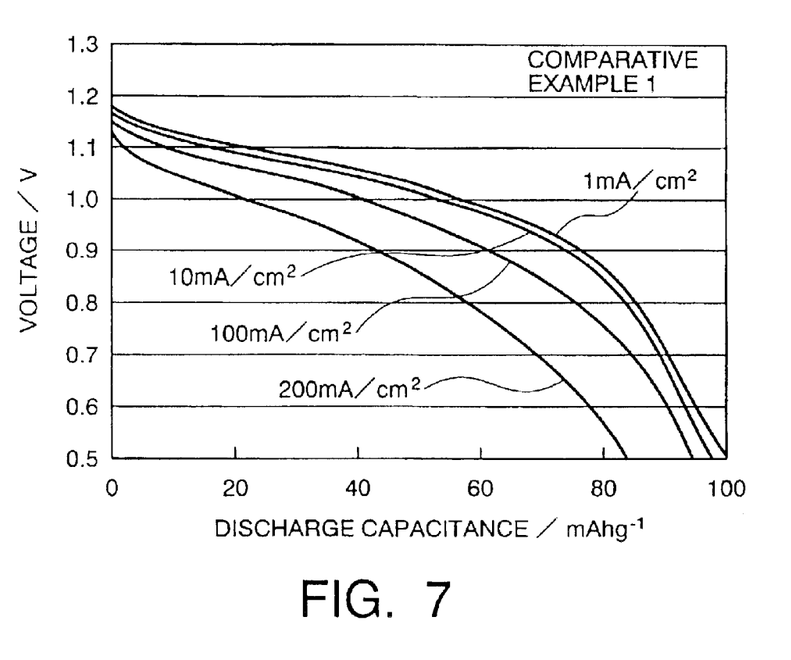
FIG. 7 is a graph showing results (discharge curves) of a charge/discharge test of the cell according to comparative example 1.

A charge/discharge test was conducted like in Example 1. The results are shown in FIG. 7. A list of capacitances down to 0.9V is shown in Table 2. When the discharge current was increased from 1 mA/cm$^2$ to 200 mA/cm$^2$, the discharge capacitance was decreased from 77 mAh/g to 44 mAh/g and thus the reduction rate was 43%.

Further, a cycle test was conducted like in Example 1. As a result, the number of cycles wherein the capacitance was decreased to 80% of the initial capacitance was 24000.

Comparative Example 2

A cell was prepared that was the same as that of Example 1 except that poly-5-cyano indole being indole-related polymer was used as an active material of a positive electrode material layer 17.

A charge/discharge test was conducted like in Example 1. A list of capacitances down to 0.9V is shown in Table 2. When the discharge current was increased from 1 mA/cm$^2$ to 200 mA/cm$^2$, the discharge capacitance was decreased from 85 mAh/g to 64 mAh/g and thus the reduction rate was 25%.

Further, a cycle test was conducted like in Example 1. As a result, the number of cycles wherein the capacitance was decreased to 80% of the initial capacitance was 15000.

Comparative Example 3

A cell was prepared that was the same as that of Example 1 except that poly-6-nitro indole being indole-related polymer was used as an active material of a positive electrode material layer 17, and a PC solution wherein 1 mol/l of tetrafluoroboric acid tetraethylammonium and 0.1 mol/l of trifluoroacetic acid were dissolved was used as an electrolyte.

Figure 8:
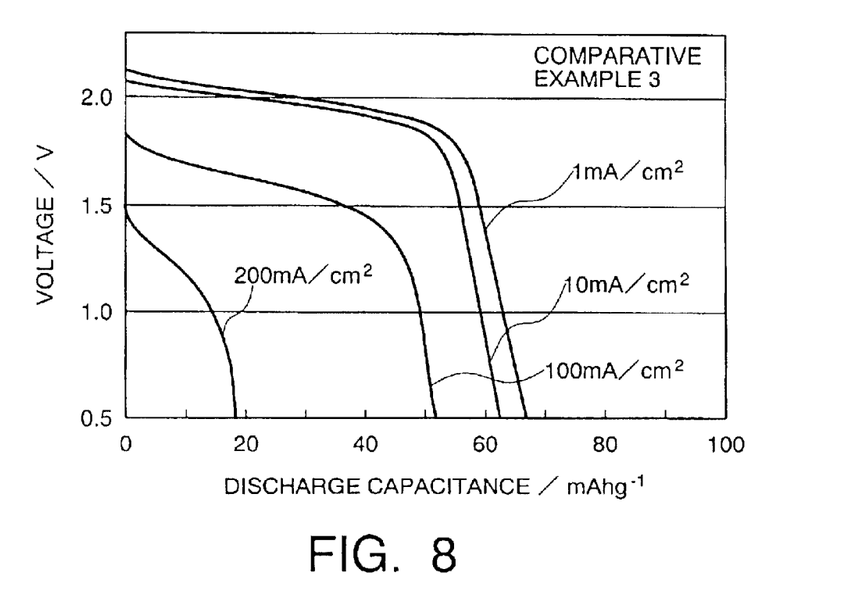
FIG. 8 is a graph showing results (discharge curves) of a charge/discharge test of a cell according to comparative example 3.

A charge/discharge test was conducted like in Example 1. The results are shown in FIG. 8. A list of capacitances down to 0.9V is shown in Table 2. When the discharge current was increased from 1 mA/cm$^2$ to 200 mA/cm$^2$, the discharge capacitance was decreased from 67 mAh/g to 18 mAh/g and thus the reduction rate was 73%.

Further, a cycle test was conducted like in Example 1. As a result, the number of cycles wherein the capacitance was decreased to 80% of the initial capacitance was 12000.

As described above, according to the preferred embodiment of the present invention, the mixture of the indole-related trimers and the indole-related tetramers is used as the electrode active material. Thus, as compared with the indole-related trimers are used alone, the electrochemical cell, such as the secondary cell or the capacitor, that is excellent in high-rate characteristic and cycle characteristic can have the increased capacitance, while having the sufficient electromotive force. Moreover, the cycle characteristic is also improved.

What is claimed is:

1. An electrochemical cell containing, as an electrode active material, a mixture of trimer compounds each in the form of indoles or indole derivatives coupled to each other in second and third positions thereof, and tetramer compounds each of indoles or indole derivatives, wherein protons are used as charge carriers.

2. The electrochemical cell according to claim 1, wherein, upon giving and receiving electrons following an oxidation-reduction reaction of said trimer compounds and said tetramer compounds, only adsorption-desorption of protons of said trimer compounds or/and said tetramer compounds is concerned therein.

3. The electrochemical cell according to claim 1, wherein each of said trimer compounds is a compound represented by general formula (I):

TABLE 2

| | electrode conductivity (S/cm) | electrolyte | voltage (V) | capacitance charge/discharge current density (mA/cm$^2$) | | | | cycle characteristic (cycle) |
|---|---|---|---|---|---|---|---|---|
| | | | | 1 | 10 | 100 | 200 | |
| Example 1 | 4.1 | sulfuric acid aqueous solution | 1.2 | 93 | 88 | 76 | 66 | 38000 |
| Example 2 | 5.1 | sulfuric acid aqueous solution | 1.3 | 97 | 90 | 83 | 72 | 29000 |
| Example 3 | 4.1 | PC solution | 2.2 | 75 | 73 | 65 | 43 | 25000 |
| Reference Example 1 | 4.2 | sulfuric acid aqueous solution | 1.2 | 78 | 76 | 68 | 62 | 31000 |
| Reference Example 2 | 5.2 | sulfuric acid aqueous solution | 1.3 | 86 | 84 | 79 | 72 | 25000 |
| Reference Example 3 | 4.2 | PC solution | 2.2 | 70 | 68 | 60 | 39 | 19000 |
| Comparative Example 1 | 2.7 | sulfuric acid aqueous solution | 1.2 | 79 | 76 | 65 | 45 | 24000 |
| Comparative Example 2 | 3.5 | sulfuric acid aqueous solution | 1.3 | 85 | 84 | 77 | 64 | 15000 |
| Comparative Example 3 | 2.7 | PC solution | 2.2 | 67 | 63 | 52 | 18 | 12000 |

(I)

wherein R independently represents a hydrogen atom or a substituent group thereof, and
wherein each of said tetramer compounds is a tetramer of indoles or indole derivatives of the same kind.

4. The electrochemical cell according to claim 1, wherein said trimer compounds have a mixing ratio of 60 mass % or less relative to said tetramer compounds.

5. The electrochemical cell according to claim 1, comprising an electrode containing the mixture of said trimer compounds and said tetramer compounds within a range of 30 to 95 mass %.

6. The electrochemical cell according to claim 1, comprising a solution containing $10^{-3}$ to 18 mol/l of protons as an electrolyte.

7. The electrochemical cell according to claim 1, said cell being a secondary cell.

8. The electrochemical cell according to claim 1, said cell being a capacitor.

* * * * *